May 6, 1952 G. M. TRACY 2,595,908
AUTOMATIC WEIGHING MACHINE
Filed April 3, 1946 7 Sheets-Sheet 1

Inventor
Glen M. Tracy
By Bacon & Thomas
Attorneys

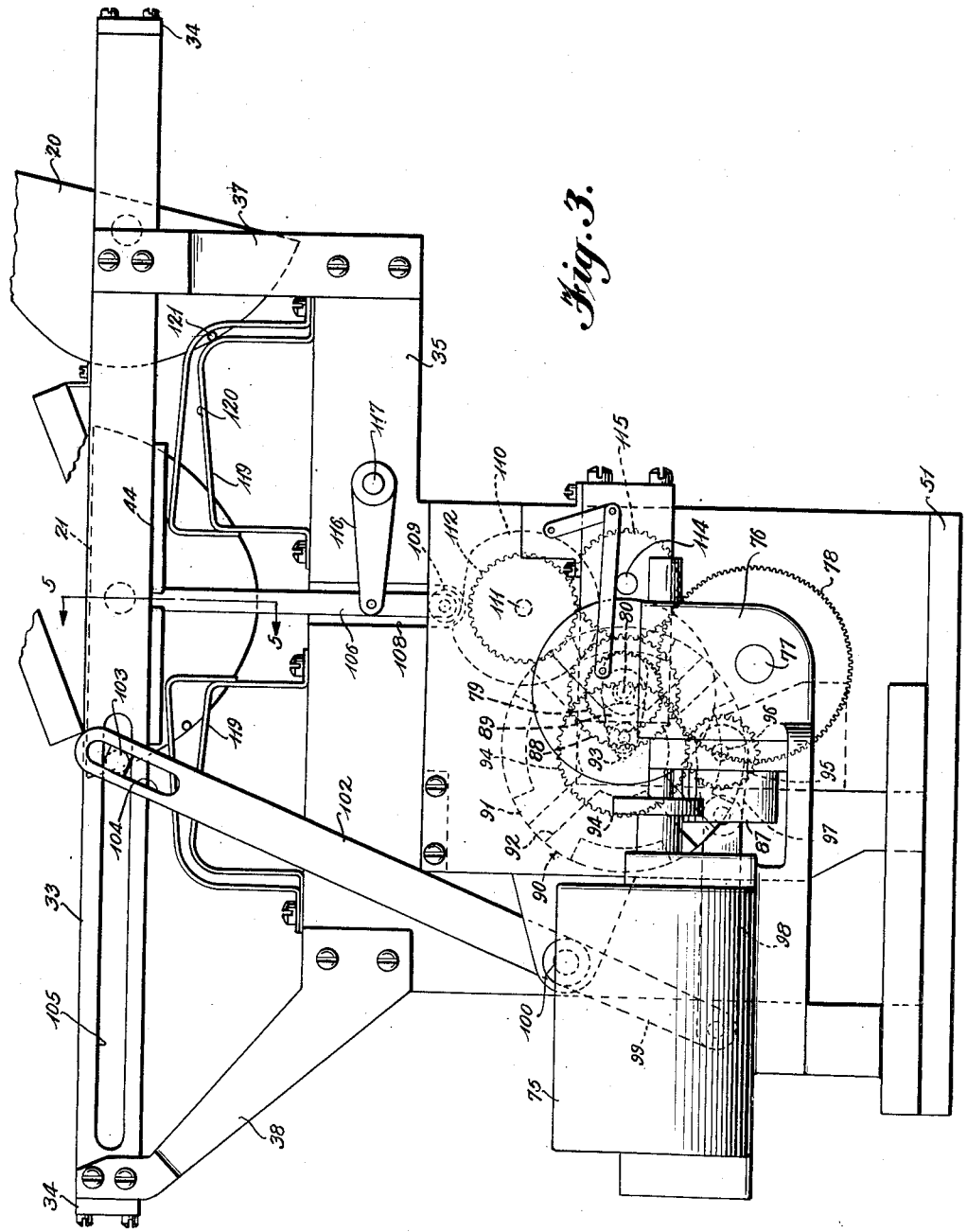

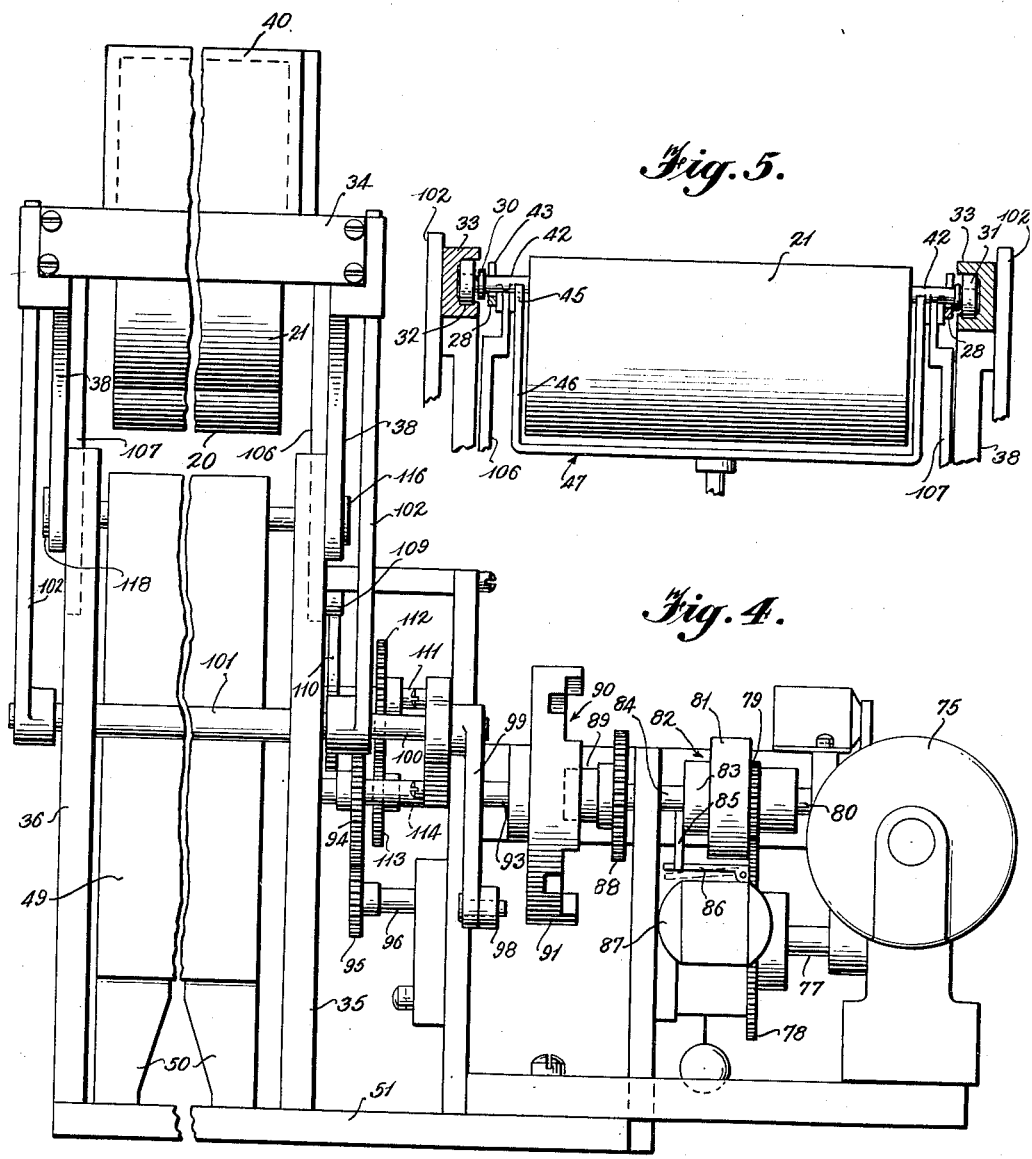

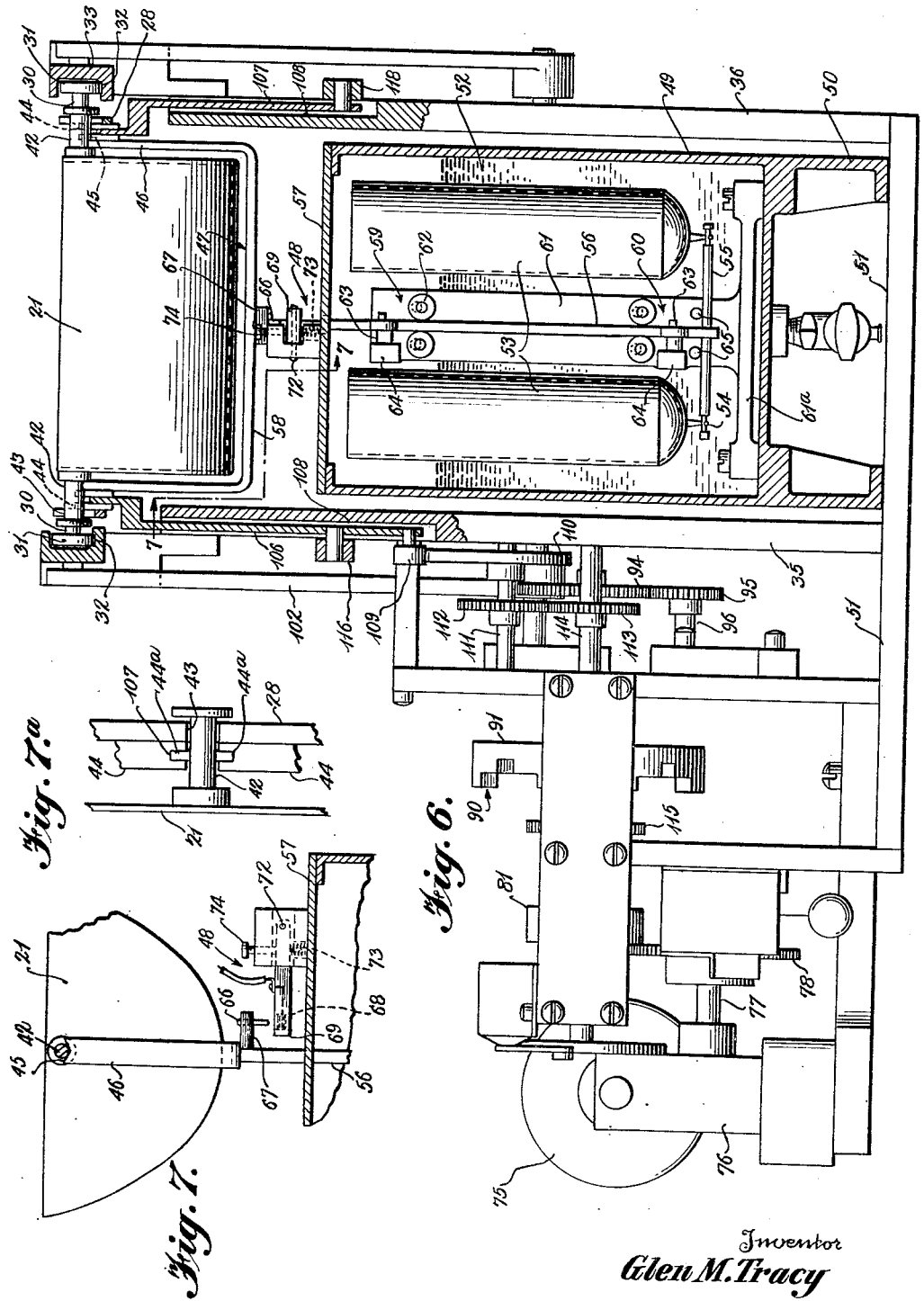

May 6, 1952  G. M. TRACY  2,595,908
AUTOMATIC WEIGHING MACHINE
Filed April 3, 1946  7 Sheets-Sheet 6

Inventor
Glen M. Tracy
By Bacon & Thomas
Attorneys

May 6, 1952 G. M. TRACY 2,595,908
AUTOMATIC WEIGHING MACHINE
Filed April 3, 1946 7 Sheets-Sheet 7
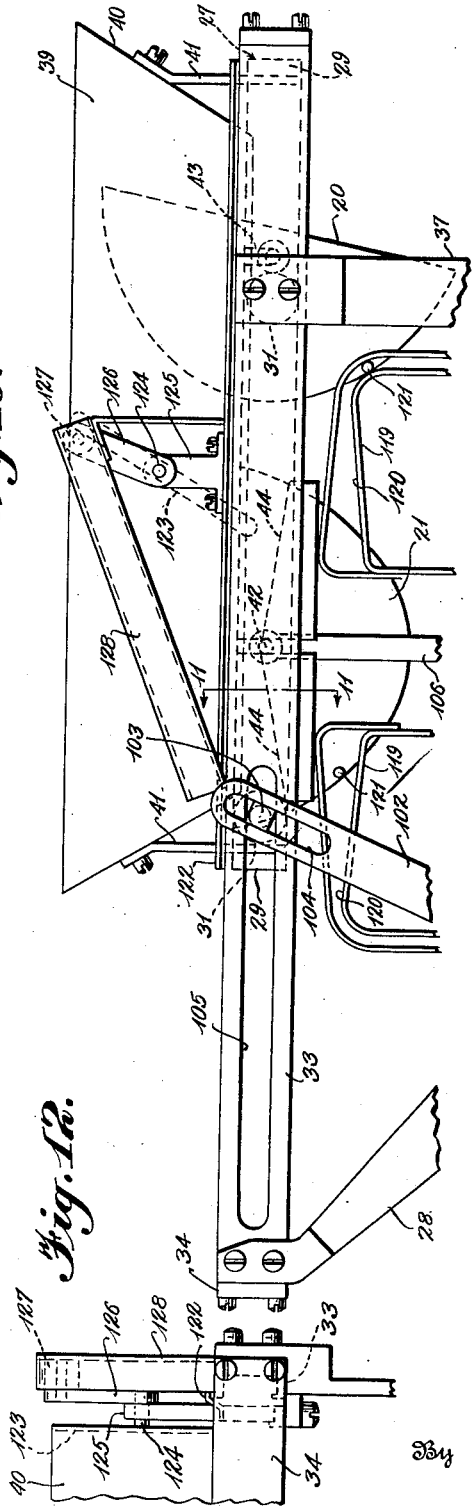
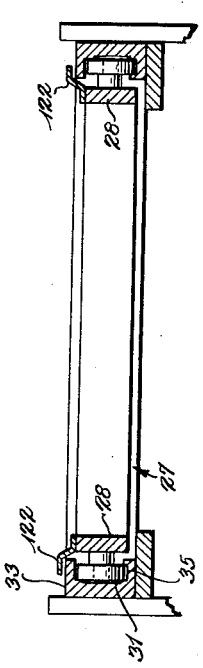
Inventor
*Glen M. Tracy*
By *Bacon & Thomas*
Attorneys Patented May 6, 1952

2,595,908

UNITED STATES PATENT OFFICE 2,595,908

AUTOMATIC WEIGHING MACHINE

Glen M. Tracy, Durham, N. C., assignor to Wright Machinery Company, Durham, N. C., a corporation of North Carolina Application April 3, 1946, Serial No. 659,263

19 Claims. (Cl. 249—28)

1

This invention relates to improvements in automatic weighing machines and more particularly, although not necessarily, the invention is concerned with weighing machines of the multiple-receiver type.

One object of the invention is to provide a machine which will automatically weigh material and discharge it in quantities of a uniform, predetermined weight.

A further object is to provide a machine which, although it may be fed by hand, is characterized by features which enable it to accurately weigh material delivered to it continuously from a conveyor or hopper, or otherwise.

A still further object is to provide a machine which is adapted for high-speed operation, this object contemplating a machine which is so designed that while material to be weighed is being delivered to one receiver, a second receiver into which the proper weight of material has been previously introduced is discharging its contents.

A still further object is a machine wherein provision is made for preventing the escape, or loss, of any of the material to be weighed while an empty receiver is being substituted for the receiver into which the proper amount of material has been introduced and from which such material is to be discharged.

A still further object is to provide a machine wherein the movement of the parts is positively controlled by the flow of the material being weighed and wherein such parts move freely with a minimum of friction and without any tendency to hunt.

A still further object is a novel design and arrangement of the parts of the machine, whereby to achieve simplicity and compactness in construction and insure smooth and quiet operation.

The invention is illustrated in the accompanying drawings, in which:

Figure 3 is a similarly enlarged view in elevation of the back of the machine, the hopper, discharge chute and spout being omitted.

Figure 4 is an end elevational view of the machine;

Figure 5 is a fragmentary sectional view taken along line 5—5 of Figure 3;

Figure 6 is a transverse section taken along line 6—6 of Figure 1;

Figure 7 is a detail section view taken along line 7—7 of Figure 6;

2

Figure 9:
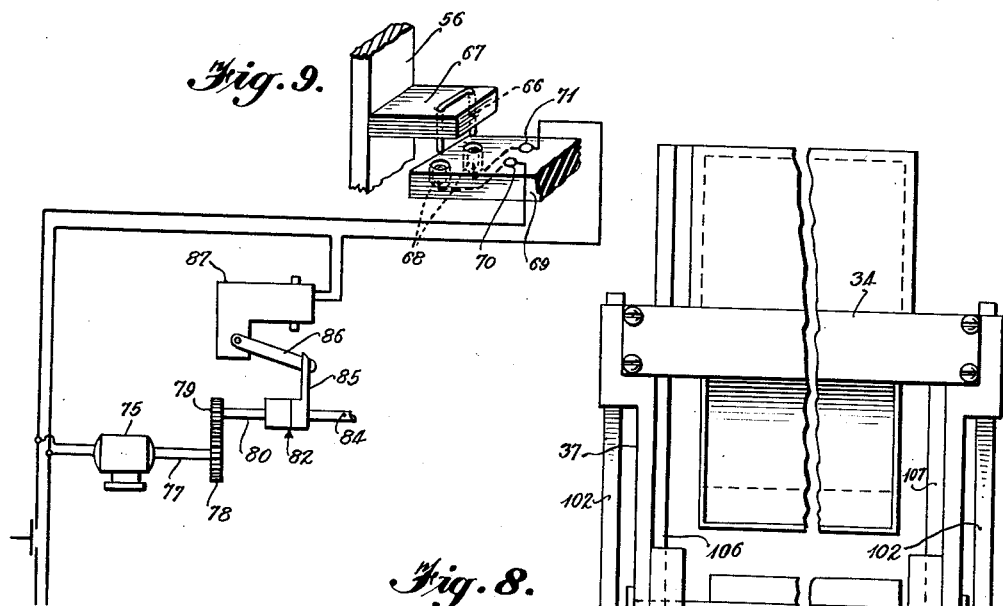
Figure 8:
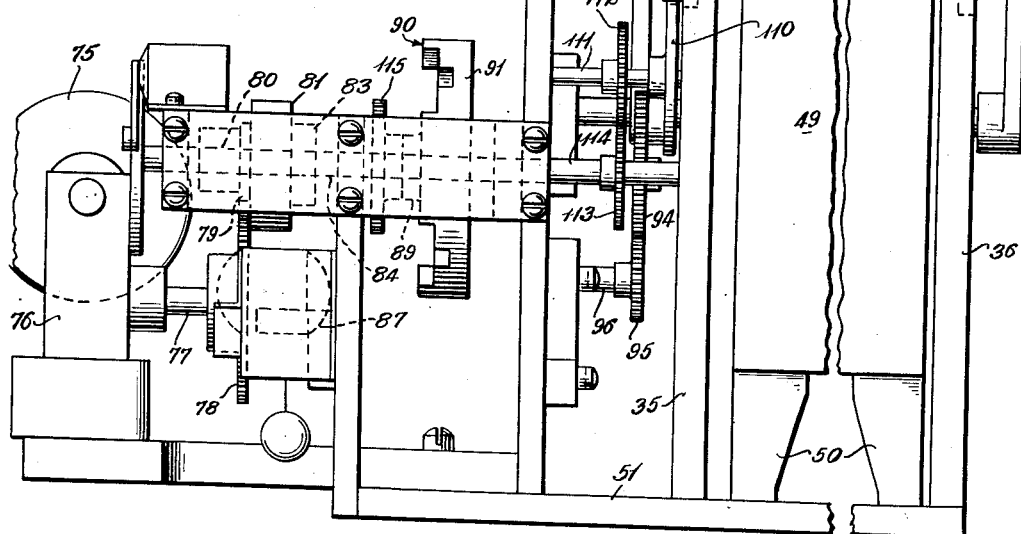

Figure 7a is a fragmentary plan view;

Figure 8 is a view in elevation of the opposite end of the machine from that shown in Figure 4;

Figure 9 is a diagrammatic view showing the wiring circuit for the clutch-actuating solenoid;

Figure 10 is an enlarged elevational view of the upper part of the back of the machine showing the hopper on the carriage;

Figure 11 is a fragmentary, transverse section taken along line 11—11 of Figure 10; and Figure 12 is a fragmentary end elevational view of the upper part of the machine.

The machine, as illustrated, includes two substantially semi-cylindrical receivers 20 and 21 into which material to be weighed may be introduced from a conveyor 22. The material to be weighed, whether free flowing or otherwise, is preferably discharged from the conveyor 22 continuously while the receivers 20 and 21 are positioned, first one and then the other, under the discharge end of the conveyor 22 to receive such material.

Mechanism is provided for automatically and successively moving the receivers 20 and 21 into a position under the discharge end of the conveyor 22 in the manner described and for automatically moving the receivers from under the conveyor 22 when the proper amount of material has been delivered to them, the said mechanism being operative to move the receiver 20 after loading to a discharging position over one branch 23 of a discharge chute 24 as the then empty receiver 21 is moved to a receiving position under the conveyor 22 and being operative to move the loaded receiver 21 to a discharging position over a second branch 25 of the discharge chute as the then empty receiver 20 is moved back to a receiving position under the conveyor. The material entering the branches 23 and 25 of the chute 24 flows by gravity to a spout 26 from which it may discharge into suitable containers.

The mechanism for transferring the receivers 20 and 21 between receiving and discharging positions includes a carriage 27, the latter, which is generally rectangular in shape, having side frame members 28 and end cross-pieces 29. Stub axles 30 (Figure 6) on the side frame members 28 of the carriage 27 carry rollers 31 which ride in trackways 32 provided by longitudinally extending channel members 33. The latter are arranged with their channels facing one another, and at their opposite ends they are connected by cross-members 34. The rectangular track-providing framework described is supported by, and above, spaced-apart, side panels 35 and 36 and to this end vertical arms 37 connect the channel members 33 adjacent one end to lateral extensions at the upper ends of the side panels while angular extending arms 38 connect the opposite ends of the channel members to the adjacent corners of the side panels.

In order to insure entry of the material to be weighed into the receivers 20 and 21, the carriage 27 may, as shown in Figure 10, carry a hopper comprising an assembly of side and end plates 39 and 40, respectively, the hopper thus provided being mounted upon the carriage 27 by straps 41 which are connected at their upper ends to the end walls 40 of the hopper and at their lower ends to the end cross-pieces 29 of the carriage 27. As best shown in Figure 5, each of the receivers 20 and 21 has aligned trunnions 42 which are accommodated in vertical, open-ended slots 43 in the side frame members 28 of the carriage. Except during actual weighing operations and while the receivers 20 and 21 are approaching and leaving the position at which such operations are performed, the receivers 20 and 21 are supported by their trunnions 42 on the carriage 27, as will be explained hereinafter.

Figure 1:
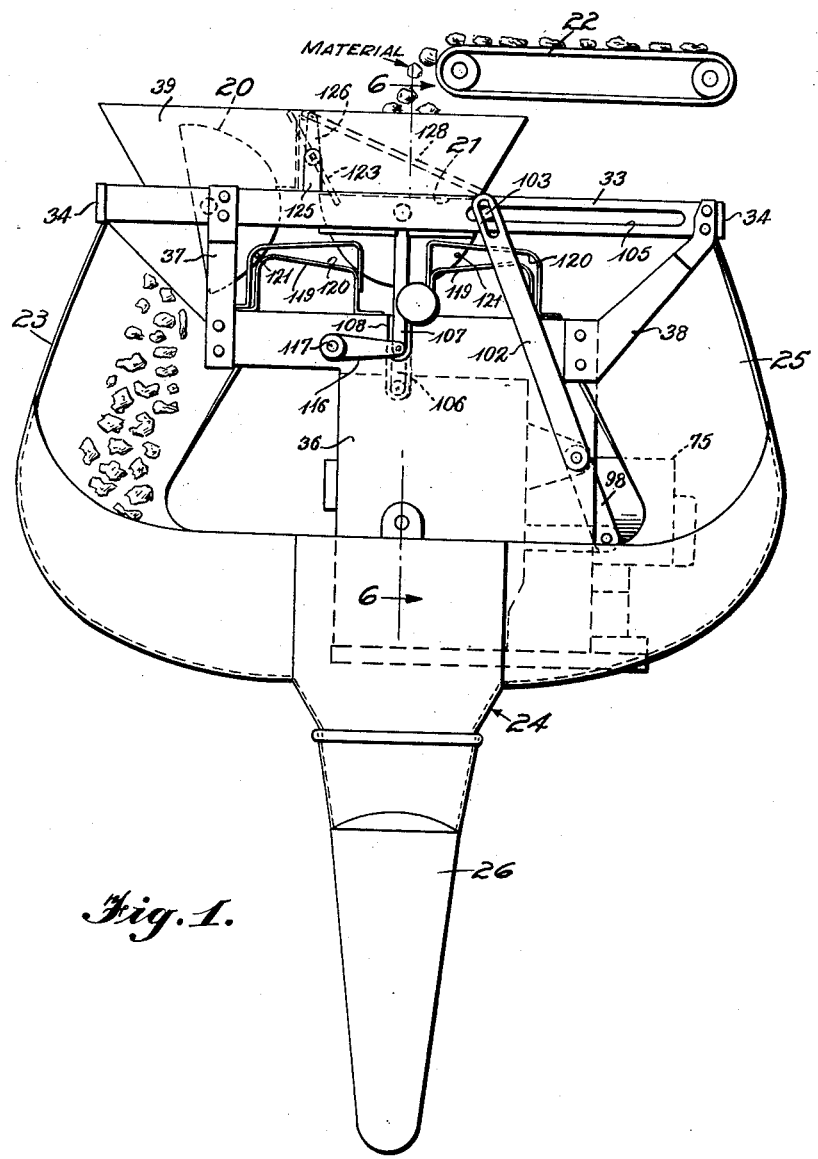
Figure 1 is a front elevational view of a weighing machine embodying the features of the invention.

Referring to Figure 1, it will be noted that the receiver 21 is located in a position to receive material from the discharge end of the conveyor 22 while the receiver 20 is located in a discharging position over the branch 23 of the discharge chute 24. When the receivers 20 and 21 are located at these positions, the carriage 27 occupies one limit of its range of movement. At the other limit of the range of movement of the carriage 27, the receiver 20 is located in a position to receive material from the conveyor 22 while the receiver 21 is located in a discharge position over the branch 25 of the discharge chute 24.

When the receiver 21 occupies the position shown in Figure 10, the trunnions 42 thereof are located between pairs of spaced-apart, cooperating cam plates 44 and rest in notches 45 (Figure 5) in the upper ends of the arms 46 of a yoke 47 and are supported by the arms 46 above the lower ends of the slots 43. In this connection it will be noted that the top edges of the cam plates 44 are inclined upwardly and are located in the paths of the trunnions 42 on the receivers 20 and 21 so that as an empty receiver is moved by the carriage 27 to a position to receive material from the conveyor 22, the top edges of the cam plates 44 act upon the trunnions 42 to elevate the receiver with respect to the carriage 27. As this occurs, the trunnions 42 are elevated in the slots 43 in the side frame members 28 of the carriage 27 so that the receiver is supported by its trunnions upon the cam plates 44 until it comes to the proper position over the yoke 47, at which time the trunnions 42 ride off the cam plates 44 and into the notches 45 in the upper ends of the yoke arms 46.

The yoke 47 and the arms 46 thereof are parts of a weigher 48 arranged directly below the discharge end of the conveyor 22 and at a point substantially midway of the length of the channels 33 which guide the carriage 27. The weigher may, as illustrated, be of the type disclosed in my copending application Serial No. 599,141, filed June 13, 1945, now Patent No. 2,522,767, issued Sept. 19, 1950, although the features of the present invention may be readily adapted to various other types of weighers.

As best shown in Figures 6 and 7, the weigher 48 is located between the side panels 35 and 36 of the machine and includes a tank 49 having feet 50 which rest upon a base plate 51. The tank 49 contains a body of liquid 52 which may be oil of a low viscosity or any other suitable liquid of low viscosity. Cooperating, spaced-apart cylindrical floats 53, preferably formed of a light weight material, are partially immersed in the body of liquid 52. At their lower ends the floats 53 are formed or provided with hooks 54 which engage reduced portions of the opposite ends of a cross-piece 55, the latter being carried by the lower end of a vertical bar 56 which is generally rectangular in cross-section and which extends through a suitable opening in the cover 57 of the 49. At its upper end the bar 56 is connected to the cross member 58 of the yoke 47 midway between the arms 46 thereof.

Free movement of the bar 56 in the direction of its length is permitted by upper and lower groups of rollers 59 and 60, respectively, which are mounted on a vertical column 61. The latter is located between the two floats 53 and extends upwardly from a base 61a which is suitably secured to the bottom of the tank 49. Each group of rollers 59 and 60 includes two pairs of rollers. One pair of rollers of each group contacts two of the opposite sides of the bar 56 while the other pair of rollers of each group contacts the other two opposite sides of the bar. The rollers, therefore, which are preferably of the anti-friction type, permit free vertical movement of the bar 56. Lateral movement, however, is prevented. It will be noted that the lower pair of rollers of the upper group 59 and the upper pair of rollers of the lower group 60 are mounted upon studs 62 which are carried directly by the body of the column 61. The remaining pairs of rollers of the upper and lower groups are mounted on studs 63 which are carried by laterally extending arms 64. In order to provide for adjustment of the various rollers of the groups 59 and 60, the studs 62 and 63, as best shown in Figure 6, are formed to provide eccentric mountings. When so formed the studs 62 and 63 may be readily adjusted so that the rollers will engage the bar 56 in such a manner as to insure proper movement of the bar 56 with a minimum of friction and lateral movement.

It will be apparent from the foregoing that when either of the receivers 20 and 21 is supported in the yoke 47 in the manner described, any material introduced into such receiver will, through the agency of the weight sensitive system which includes the floats 53, cause the displacement of fluid in the tank 49 in proportion to the weight of such material. Although the weight sensitive system may be designed so that the magnitude of its movement will be proportional to the weight of the material introduced into the receiver, it is preferred to pre-load the system so that movement of the latter will not occur until the weight of such material reaches a predetermined value preferably only slightly in excess of the buoyant force exerted by the liquid upon the floats 53, etc. In the embodiment of the invention illustrated, pre-loading of the weighing mechanism is accomplished by the use of stop pins 65. The latter are carried by the column 61 and extend laterally from the column 61 across the cross-piece 55 to limit upward movement of the floats 53, and hence of the weight sensitive system. Assuming the level of the liquid 52 in the tank 49 to be as shown, it will be apparent that the floats 53 are held immersed below the level corresponding to that at which the amount of liquid displaced corresponds to the weight of the weight sensitive system.

Under such conditions, the cross-piece 55 will, as shown, engage the cross-pins 65, it being apparent that any desired degree of pre-loading may be attained merely by varying the height of the liquid 52 in the tank 49. As the floats 53 have loose connections with the ends of the cross-piece 55, they may, within limits, move within the tank 49 without contacting the walls of the latter or the column 61. Hence the weight sensitive system may move freely without frictional opposition.

In the use of the machine, the material is introduced into the receiver which happens to be supported in the yoke 47, the floats 53 preferably being pre-loaded, as noted, so that downward movement of the receiver will not occur until the material in the container is of the predetermined weight. The downward movement of the weight sensitive system which occurs when the material in the receiver is of the proper weight is utilized to control the shifting operation of the carriage 27 so that the loaded receiver may be moved immediately to its discharge position and emptied simultaneously with the movement of an empty receiver into loading position. To this end, the bar 56 carries an electrically conductive bridge 66, the latter being suitably insulated from the bar 56 by an insulating block 67 which is employed in mounting the bridge 66 upon the bar 56. In the elevated position of the receiver and the weight sensitive system which carries the receiver (the position in which the cross-piece 55 engages the stop pins 65) the lower ends of the bridge 66 are located above and in spaced relation with respect to pools of mercury 68 or any other suitable electrically conductive liquid. The mercury pools 68 are insulated from one another, being carried by an insulating block 69 and one being connected to a terminal 70 (Figure 9) on the block 69 and the other being connected to a terminal 71. The two mercury pools 68 and the bridge 66, therefore, provide a normally open switch which will be closed upon downward movement of the weight sensitive system. The switch 66—68 thus provided may be adjusted so that any desired amplitude of movement of the weight sensitive system will cause it to close. For this purpose, and as best shown in Figure 7, the block 69 is pivotally mounted upon a pin 72. A spring 73 which acts upon the block 69 is operative to hold the latter against the lower end of a stop pin 74 which is adjustable so that the spacing of the mercury pools 68 with relation to the lower ends of the bridge 66 may be varied at will.

In accordance with the invention, the movement of the weight sensitive system which includes the floats 53, the yoke 47 and the receiver carried by the yoke, and which occurs when the proper weight of material has been introduced into the receiver, is utilized to automatically control the shifting operation of the carriage 27 to effect dumping of the contents of the loaded receiver into the discharge chute. To this end, the machine includes a continuously running motor 75 which is connected through a gear reduction unit 76 and a shaft 77 driven by the latter to a driving gear 78. The latter meshes with a gear 79 on a shaft 80. A driving disc 81 (Figure 4) of a clutch 82 is also fixed to the shaft 80 and frictionally engages a disc 83 fixed to the adjacent end of an aligned shaft 84. The disc 83 carries an arm 85 and is normally held against rotation by the armature 86 of an electromagnet 87, the armature of the electro-magnet 87 being normally located in the path of the arm 85, thereby preventing the shaft 84 from being driven by the shaft 80.

Referring to Figure 9, it will be noted that an electric circuit for the electro-magnet 87 includes, and hence is controlled by, the switch which is provided by the mercury pools 68 and the bridge 66, energization of the electro-magnet 87 being operative to withdraw the armature 86 from the path of the arm 85 to thereby permit the shaft 80 to drive the shaft 84. As will appear more clearly hereinafter, the electro-magnet 87 is energized only momentarily. Hence, the armature 86 is permitted to return almost immediately to its original position so that the clutch 82 acts as a one-revolution clutch. Thus, each time the electro-magnet 87 is energized it permits the shaft 84 to turn one revolution.

Figure 2:
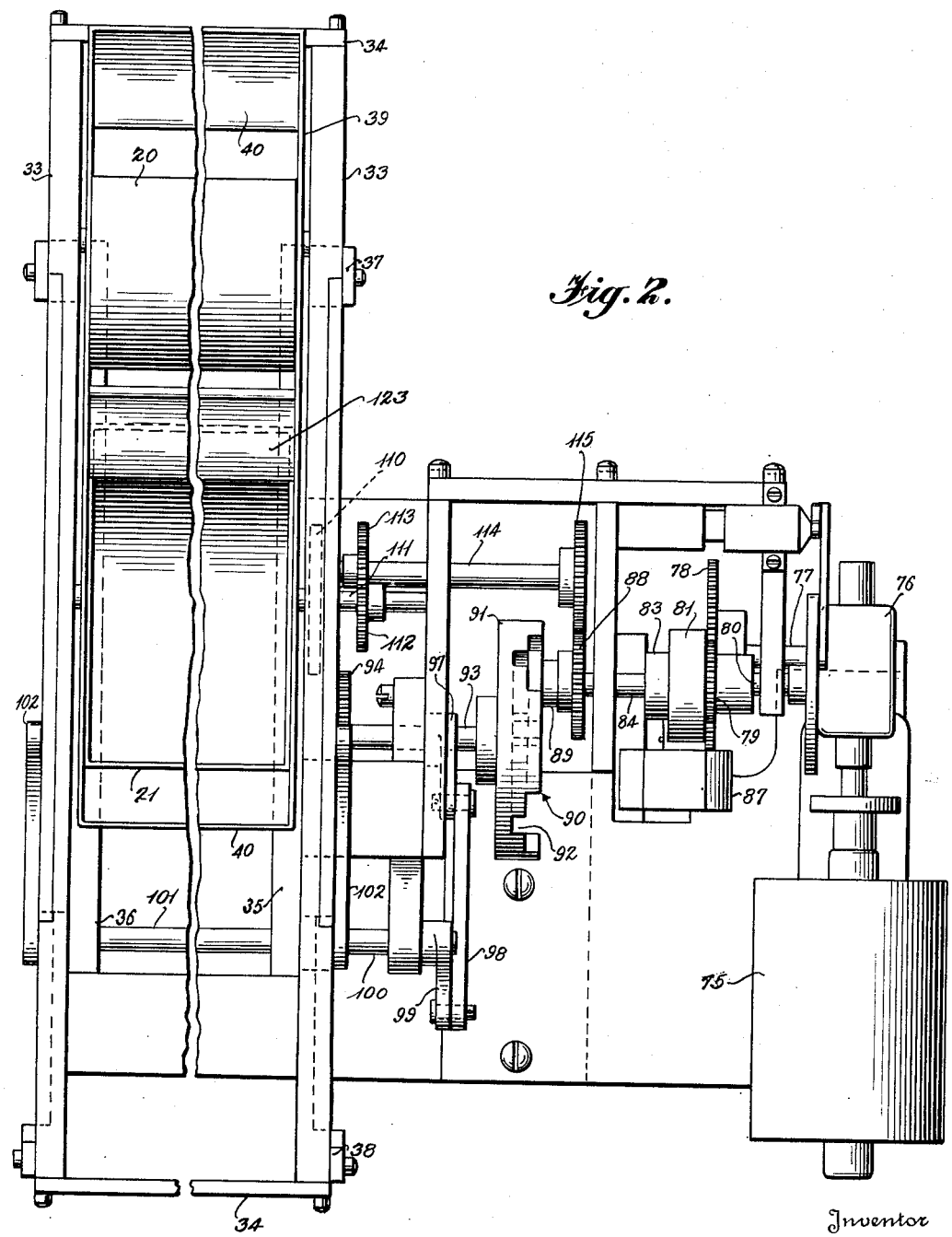
Figure 2 is an enlarged top plan view of the machine.

The shaft 84 carries a gear 88 and the crank 89 of a Geneva movement 90 (Figure 2). The driven disc 91 of the Geneva movement 90 is channeled in conventional manner as indicated at 92 in Figure 3 so that each time the shaft 84 turns through one revolution, the driven disc 91 of the Geneva movement 90 is turned through a ¼ turn or an angular distance of 90°. The driven disc 91 is carried by and drives a shaft 93. The latter carries a gear 94 which meshes with a gear 95 on a shaft 96, the outer end of which carries a crank 97 (Figure 3). A link 98 connects the outer end of the crank 97 to the lower end of a crank 99 which is carried by an extension 100 (Figure 4) of a cross shaft 101, the latter being mounted between the side panels 35 and 36. The cross shaft 101 carries arms 102 which at their upper ends are connected to the opposite sides 28 of the carriage 27 by stud-like elements 103. The latter are adapted to turn freely and are accommodated in slots 104 in the upper ends of the arms 102. Longitudinally extending slots 105 are also formed in the channel members 33 to accommodate the elements 103.

It is to be noted that the ratio of the gear 95 to the gear 94 is one-to-two. Hence, for each 90° movement of the shaft 93 the crank 97 turns through an angular distance of 180°. Through its connection to the crank 97 by the arms 102, cross shaft 101, crank 99 and link 98, therefor, the carriage 27 will, each time that it is moved as a result of energization of the electro-magnet 87, be moved or shifted from one limit of its range of movement to the other limit, it being understood that the carriage 27 is so designed that the trunnions 42 of one or the other of the receivers is in registration with the yoke arms 46 when the carriage 27 comes to rest at either limit of its travel, and that the receivers 20 and 21 are shifted in unison while the carriage 27 is in motion.

Means are provided for lifting or raising the receiver into which the proper weight of material has been introduced from the conveyor 22, off the arms 46 of the yoke 47 of the weighing mechanism and above the level of the cam plates 44 prior to shifting of the carriage 27 to move the loaded receiver to a discharge position while moving the other or empty receiver to a loaded or material receiving position. The means referred to includes lifting bars 106 and 107 (Figure 6) which are located in channels 108 in the side panels 35 and 36 and which are guided at their upper ends in grooves 44a (Figure 7a) in the adjacent inner ends of the cam plates 44 so that the lifting bars 106 and 107 may move only up or down. The lifting bar 106, as best shown in Figure 3, carries a roller 109 at its lower end which rides upon a cam 110. The latter is fixed to a shaft 111 (Figure 2) while a gear 112, also on the shaft 111, meshes with a gear 113 which is carried by a shaft 114. A gear 115 on the latter shaft meshes with the gear 88 on the shaft 84. In order that any movement imparted to the lifting bar 106 will also be imparted to the bar 107, the former is connected by an arm 116 (Figure 3) to a cross-shaft 117 which is mounted between the side panels 35 and 36. A similar arm 118 connects the lifting bar 107 to the cross-shaft 117.

The mechanism for actuating the lifting bars 106 and 107 is so timed that while the receiver 20 is supported by its trunnions 42 upon the arms 46 of the yoke 47 and the material from the conveyor 22 is being fed into it, the clutch disc 83 is held stationary through the arm 85, and the cam 110 is at rest in a position such that the upper ends of the lifting bars 106 and 107 are located below, and in spaced relation with respect to, the trunnions 42 of the receiver 20, as illustrated in Figure 6. When the proper weight of material has been introduced into the receiver 20, however, and the weight sensitive system has moved downwardly the slight distance necessary to contact the ends of the bridge 66 with the mercury pools 68, the energizing circuit to the electromagnet 87 is closed, moving the armature 86 out of the path of the arm 85 so that the disc 83 of the clutch 82 is released to permit the shaft 84 to turn one revolution. When this occurs, the cam 110 is operative to elevate the lifting bars 106 and 107 and the latter engage the trunnions 42 of the receiver 20 and lift it off the arms 46 of the yoke 47, elevating the receiver 20 as they do this to a position in which the trunnions 42 are located above the top edges of the cam plates 44. Thereafter, the shaft 84 is operative through the medium of the Geneva movement 90 to actuate the arms 102 and in so doing move or shift the carriage 27 toward the left (as viewed in Fig. 1) to carry the receiver 20 to a discharge position. During the initial part of such movement the trunnions 42, which at this time are located a substantial distance above the bottoms of the slots 43 in the side frame members 28 of the carriage 27 move off the upper ends of the lifting bars 106 and 107 and onto the top edges of the cam plates 44. During continued movement of the carriage 27 the trunnions of the receiver move down the inclined top edges of the cam plates 44 until they rest upon the bottoms of the slots 43, the weight of the receiver 20 and its contents being transferred to and carried by the carriage 27 during the final part of the movement of said receiver to its discharge position.

Each of the side panels 35 and 36 carries guide brackets 119 (Figure 3) which provide guideways 120 for pins 121 which are carried by, and which extend from, the opposite end walls of the receivers. The pins 121 are disposed a predetermined distance from the trunnions 42 and are offset to one side of a vertical plane passing through said trunnions. Hence, during the final part of the carriage movement, the outer, downwardly curved portions of the guideways 119 in which the pins 121 on the loaded receiver are located are operative to prevent substantial further movement of said pins and in so doing cause the receiver to automatically tilt or swing on its trunnions 42 to discharge its contents into the proper branch of the discharge chute 24.

As a loaded receiver is being moved by the carriage 27 to a discharge or tilted position, the carriage 27 is also moving the other or empty receiver to a material receiving position on the arms 46 of the yoke 47 of the weigher, it being noted that the brackets 119 and pins 121 cooperate to automatically right the tilted receiver upon reverse travel of the carriage 27 and, furthermore, permit the receivers to occupy horizontal positions at all times except when they approach their discharge positions.

Preferably the side frame members 28 of the carriage 27 carry flanges 122 (Figures 10 and 11). The flanges 122 overlie the channel members 33 of the stationary framework of the machine, thereby shielding the guideways 33 for the rollers 31 of the carriage to keep said guideways free of any material fed by the conveyor 22 which inadvertently fails to fall into the hopper 39—40.

In order to insure delivery of the material from the conveyor 22 first into one receiver and then into the other in the proper amounts, a deflector plate 123 (Figures 1, 10 and 12) is preferably employed. The deflector plate is pivotally mounted on the carriage 27 between the hopper side plates 38, stub shafts 124 on the deflector plate 123 being mounted in bearing brackets 125 which are mounted on the side frame members 28 of the carriage 27 as best shown in Figures 10 and 12. An extension on one of the stub shafts 124 carries a crank arm 126 and the outer end of the latter carries a roller 127, the roller being located in a guideway provided by a channel member 128 which is inclined from the horizontal and suitably supported upon a channel member 33 of the stationary framework.

When the carriage 27 is at rest at one limit of its travel, the deflector plate 123 occupies an angular position which will insure entry of material being discharged from the conveyor 22 into the receiver then located on the weigher. When the carriage 27 is actuated to move the loaded receiver from the lifting bars 106 and 107 to a discharge position, the deflector plate 123 is automatically swung to an opposite angular position to direct material from the conveyor into the empty receiver being moved onto the weigher. This is accomplished through the co-action of the roller 127 and the inclined stationary channel member 128, which effects actuation of the crank 126 to tilt the deflector plate 123 in opposite directions upon movement of the carriage 27 in reverse directions relative to said inclined channel member. The use of the deflector plate 123 in the manner described has the advantage that all of the material discharged from the conveyor 22 (although material may be discharged continuously) is caused to enter either or the other of the receivers. At the same time delivery of the proper amount of material to each receiver is insured.

In the operation of the machine, the material to be weighed is delivered continuously by the conveyor 22 into the receiver supported by the yoke 47 of the weigher. The latter being preloaded in the manner described, no movement of the fluid-displacing floats 53, and hence of the receiver, occurs until the material being introduced into the receiver attains the desired predetermined weight for which the machine has been pre-set. When such weight is attained, the liquid-displacing floats 53 are caused to move downwardly the slight distance necessary to bring the ends of the bridge 66 into contact with the mercury pools 68 carried by the block 69 and thus closes the circuit containing the electromagnet 87. The motor 75 runs continuously during the operation of the machine. Hence, when the circuit of the electromagnet 87 is closed, the armature 86 of the latter is actuated to release the arm 85 and the clutch disc 83 associated therewith to permit movement of the shaft 80 to be transmitted through the clutch 82 to the shaft 84. Rotary movement of the shaft 84 is transmitted through the gears 88 and 115 (Figure 2) to the shaft 114 and through the latter to the shaft 111 by the gears 112 and 113. At such time the cam 110 which is carried by and which is driven by the shaft 111, occupies an angular position of rest which corresponds to the lowered position of the lifting bars 106 and 107. As soon as the cam 110 starts to turn, however, a sharp rise on said cam is operative to elevate lifting bars 106 and 107 and in so doing lift the receiver supported by the arms 46 of the yoke 47. During such movement of the lifting bars, the latter engage the trunnions 42 of the receiver and in raising the receiver clear of the ends of the arms 46 of the yoke 47 elevate the trunnions 42 to a position above the top edges of the cam plates 44. During such upward movement of the lifting bars 106 and 107, the carriage 27 remains stationary, it being apparent that as the receiver is elevated, the bridge piece 66 will be simultaneously elevated to break the circuit of the electromagnet 87 to permit the armature 86 to return to its normal position. Hence, rotation of the clutch disc 83 and shaft 84 will be arrested at the completion of one revolution when the arm 85 again engages the armature 86 of the electromagnet.

After the loaded receiver has been elevated by the lifting bars 106 and 107, and as the shaft 84 continues to turn to complete its revolution, the movement of the shaft 84 is also transmitted through the Geneva movement 90 to the shaft 93, the latter as heretofore noted turning 90° for each revolution of the shaft 84. Rotary movement of the shaft 93 is transmitted through gears 94 and 95 to the shaft 96, which carries the crank 97, so that the movement of the latter may be transmitted through the link 98 to the crank 99, which is thereupon operative to turn the shaft 101 in a direction which will cause the arms 102 to shift the carriage 27 and thereby move the loaded receiver to its discharging position. During the final part of such movement the loaded receiver is tipped, as aforedescribed, to discharge its contents into a branch of the discharge chute 24. During the initial part of the movement of the loaded receiver toward discharge position, the trunnions 42 thereof are moved from the ends of the lifting bars 106 and 107 onto the cam plates 44 and ride down the latter. Thus, the trunnions 42 are gradually lowered in one of the sets of slots 43 of the side frame members 28 of the carriage 27 and come to rest in the bottoms of the slots so that during the final part of the movement of the carriage the weight of the loaded receiver is supported wholly by the carriage 27.

During the movement of the loaded receiver to a discharging position in the manner described, the cam 110 is operative to hold the lifting bars 106 and 107 in their elevated positions and the other receiver, which had been previously discharged, is moved by the carriage 27 to a position with its trunnions 42 vertically aligned with the arms 46 of the yoke 47. During such movement the trunnions 42 of the latter receiver ride up the cam plates 44 (being elevated in the other set of slots 43 in the side frame members 28 of the carriage 27 as they do this) and onto the ends of the lifting bars 106 and 107. Immediately thereafter the cam 110 is operative to lower the lifting bars 106 and 107 and thereby gradually lower the trunnions 42 of the receiver onto the ends of the arms 46 of the yoke 47 of the weigher to thereby transfer the weight of the receiver to the weigher. The bars 106 and 107 then continue their downward movement to their fully retracted position. When the material delivered to the new receiver attains the predetermined weight for which the machine is set, the cycle of operations described will be repeated except in this instance the carriage 27 will be shifted in the opposite direction to move the loaded receiver to its discharge position at the opposite limit of the range of movement of the carriage 27. In this connection it is to be noted that the ratio of the gears 94 and 95 is such that 90° movement of the former in the manner described causes movement of the latter through an angular distance of 180°. Thereby when the carriage 27 is actuated in the manner described, first one receiver and then the other will be moved to a position in registration with the weigher and each will be thereafter moved to a discharging position over the respective branch of the chute 24 provided for this purpose.

From the foregoing it will be apparent that the machine described will automatically weigh the material delivered to it from the conveyor 22, the weigher controlling the operation of the carriage 27 in such a manner that quantities of material having a predetermined weight are discharged first into one branch of the discharge chute 24 and then into the other branch. The quantities of material so delivered into the discharge chute, and which may be discharged into suitable containers, will be of uniform weight.

The use of dual receivers in the manner described has the advantage that weighing of the material may be carried out rapidly, one receiver discharging its contents while the other is receiving material to be weighed. The speed of operation of the machine is also increased by its ability to handle material fed to it continuously. In view of the fact that, as each receiver is gently lowered onto the arms 46 of the yoke 47 of the weigher as the lifting bars 106 and 107 move downwardly, and in view of the further fact that the receiver is moved onto the lifting bars 106 and 107 from the cam plates 44 prior to this lowering movement, quiet operation of the machine is insured and undesired inadvertent or premature displacement of the liquid-displacing floats 53, which might possibly otherwise occur, is prevented.

Although the machine shown and described will enable attainment of the various objects set forth, various changes in, and modifications of, the construction and arrangement of the parts thereof may be made without departing from the spirit and scope of the invention as defined by the claims appended hereto.

I claim as my invention:

1. A machine of the character described including a weigher, a receiver having opposed trunnions defining an axis and by which it is adapted to be supported on trunnion receiving means on said weigher, means engageable with said trunnions for automatically lifting said trunnions and said receiver free of said trunnion receiving means on said weigher in response to the making of a predetermined weight in said receiver and for then supporting and moving it laterally of said axis to a discharging position, and means for tipping said receiver on said trunnions as it approaches said discharging position, said last-mentioned means including an element which is carried by said receiver in radially-spaced relation with respect to the axis of said trunnions and about which said receiver turns as it is tipped.

2. A machine of the character described including a weigher having a vertically-movable, weight-responsive member, a receiver having trunnions by which it is adapted to be supported on said member, means engageable with said trunnions for automatically lifting said receiver from said member and then moving it laterally to a discharging position when the contents in said receiver attain a predetermined weight, means for tipping said receiver on said trunnions as it approaches said discharging position, and an electrically operated element controlled by the position of said member upon movement in response to the deposit of said predetermined weight of material in said receiver for rendering said first two-named means operative, said two-named means being automatically operative after the contents of said receiver have been discharged, to right said receiver, return it to a position in which the trunnions thereof are located over said member and then lower said receiver on said member.

3. A machine of the character described including a container for a body of liquid, liquid-displacing means buoyantly supported by said body of liquid, a movable carriage, a pair of receivers movable by said carriage, said carriage being movable in one direction to move one of said receivers to a position on said liquid-displacing means and the other to a discharging position and being thereafter movable in the opposite direction to move the receiver in the discharging position to a position on said liquid-displacing means while moving the receiver on the liquid-displacing means to a discharging position, and means responsive to a predetermined downward movement of said liquid-displacing means incident to the deposit of a predetermined weight of material in the receiver on the weigher for automatically actuating said carriage as aforedescribed when the material being introduced into the receiver on said liquid-displacing means attains a predetermined weight sufficient to effect said predetermined downward movement.

4. A machine of the character described including a container for a body of liquid, liquid-displacing means buoyantly supported by said body of liquid, a pair of receivers, each having axially extending trunnions by which it may be supported on said liquid-displacing means during weighing, a carriage which is engageable with the trunnions on said receivers, said trunnions being vertically movable relative to said carriage, said carriage being movable in one direction to move one of said receivers to a position on said liquid-displacing means and the other to a discharging position and which is thereafter movable in the opposite direction to move the receiver in the discharging position to a position on said liquid-displacing means while moving the receiver on the liquid-displacing means to a discharging position, means operable in response to a predetermined amount of movement of said liquid-displacing means as an incident to the deposit of a predetermined weight of material in the receiver on the liquid-displacing means for automatically actuating said carriage as aforesaid when the material being introduced into the receiver on said liquid-displacing means attains said predetermined weight, means operable in timed relation to the movement of said carriage for successively lifting the receiver from said liquid-displacing means prior to the movement of said carriage, and means automatically operable in response to the movement of the receivers relative thereto for tipping said receivers as they approach their respective discharging position.

5. A machine of the character described including a weigher, a pair of receivers, a carriage which is operable to move one of said receivers to a position on said weigher while moving the other to a discharging position and which is thereafter operable to move the receiver in the discharging position to a position on said weigher while moving the receiver on the weigher to a discharging position, means operable in response to the deposit of a predetermined weight of material in the receiver on said weigher for automatically actuating said carriage when the material being introduced into the receiver on said weigher attains said predetermined weight, a deflector plate pivotally mounted on said carriage, and means for tipping said deflector plate as the carriage is actuated to move the loaded receiver to its discharge position and to move the unloaded receiver from its discharge position to a position on the weigher, whereby to cause the material to be weighed to enter either one or the other of said receivers.

6. A machine of the character described including a weigher, a pair of receivers, each having axially extending trunnions by which it may be supported on said weigher, a carriage which is engageable with said trunnions, said carriage having means affording vertical movement of said receivers relative thereto, said carriage being movable between fixed limits first in one direction to move one of said receivers to a position on said weigher while moving the other receiver from said weigher to a discharging position and being thereafter movable in the opposite direction to move the receiver in the discharging position to a position on said weigher while moving the receiver on the weigher to a discharging position, means operable in response to the deposit of a predetermined weight of material in the receiver on the weigher for automatically actuating said carriage as aforesaid when the material being introduced into the receiver on said weigher attains said predetermined weight, means operable in timed relation to the movement of said carriage for lifting the loaded receiver from said weigher prior to the movement of said carriage, a pivotally-mounted deflector plate on said carriage, and means for tipping said deflector plate first in one direction and then in the other as said carriage moves back and forth between the limits of its range of movement, whereby to cause the material to be weighed to enter either one or the other of said receivers.

7. A machine of the character described including a weigher having a vertically movable, weight-responsive member, a receiver having trunnions by which it is adapted to be supported on said member, vertically movable means engageable with said trunnions for automatically lifting said receiver from said member when the contents of said receiver attain a predetermined weight, means for moving said receiver laterally to a discharging position, means responsive to the deposit of said predetermined weight in said receiver controlling the operation of said two-named means, and means for tipping said receiver on said trunnions as it approaches said discharging position, said last-named means being automatically operative, after the contents of said receiver have been discharged, to right said receiver, said second-named means being operable to return said receiver to a position in which the trunnions of said receiver are located over said member and said first-named means being operable to then lower said receiver onto said member.

8. A device, comprising: a reciprocable carriage; a pair of material receivers mounted upon said carriage; a framework guiding said carriage for intermittent reciprocating movement between two predetermined limits of travel; mechanism for intermittently reciprocating said carriage; a deflector plate for deflecting material into one of said receivers when said carriage is at one limit of its travel and for deflecting said material into the other receiver when said carriage is at the other limit of its travel; means pivotally mounting said deflector plate upon said carriage; means cooperable with said receivers for discharging the contents of one of said receivers at each limit of travel of said carriage; and means operable to tilt said deflector plate as said carriage is reciprocated from one limit of travel to the other.

9. An automatic weighing machine, comprising: a reciprocable carriage; a pair of material receivers mounted in space, side-by-side relation upon said carriage; a frame-work guiding said carriage for intermittent reciprocating movement; mechanism for intermittently reciprocating said carriage; means for weighing the material in one or the other of said receivers, depending upon the position of said carriage, during the interval that said carriage is stationary; a normally inclined deflector plate pivotally arranged on said carriage to deflect material to be weighed into the receiver whose contents are being weighed by said weighing means; means responsive to the deposit of a given weight of material in said last-mentioned receiver controlling the operation of said reciprocating mechanism so that said mechanism is automatically set into operation when a predetermined weight of material has been introduced into said receiver; means on said framework operative to tilt said deflector plate to a position in which it directs material to be weighed into the other receiver while said carriage is in motion; and means on said framework operative to effect dumping of the loaded receiver while said carriage is in motion.

10. An automatic weighing machine, comprising: a reciprocable carriage; a pair of material receivers mounted side-by-side upon said carriage; a framework guiding said carriage for intermittent reciprocating movement; mechanism for shifting said carriage first in one direction and then in the opposite direction between two fixed limits of travel; means for weighing material in one of said receivers during the interval that said carriage is at one limit of its travel and for weighing material in the other receiver when said carriage is at the other limit of its travel; a deflector plate for directing material to be weighed into the particular receiver whose contents are being weighed; means pivotally supporting said deflector plate relative to said carriage; means responsive to the deposit of a given weight of material in the receiver on the weigher controlling the operation of said carriage shifting mechanism so that said mechanism is automatically set into operation to shift said carriage when a predetermined weight of material has been introduced into said receiver; means operative for automatically tilting said deflector plate to direct material into the other receiver as said carriage is shifted; and means cooperable with the loaded receiver for discharging material from said loaded receiver after said carriage has started to shift the same.

11. An automatic weighing machine, as defined in claim 10, in which the means pivotally supporting the deflector plate includes pivots located above the receivers and at a point substantially midway between said receivers and wherein the means for automatically tilting the deflector plate as the carriage is shifted comprises a crank arm having one end thereof secured to one of said pivots, a roller on the opposite end of said crank arm, and an inclined trackway on the framework engaging said roller.

12. A weighing machine, comprising: a weigher; a reciprocable carriage; a framework supporting said carriage for reciprocation relative thereto; mechanism for intermittently shifting said carriage in opposite directions; a plurality of material receivers pivotally mounted on said carriage for transfer by said carriage back and forth from a position over said weigher to a dumping position, and from said dumping position to said position over said weigher; means responsive to the deposit of a given weight of material in the receiver over the weigher for setting said carriage shifting mechanism into operation to shift said carriage when a predetermined weight of material has been introduced into said receiver; and means on said framework for arresting forward movement of the leading portion of a loaded receiver while it is being transferred to dumping position by said carriage, whereby to cause said loaded receiver to tilt about its pivots and discharge its contents.

13. An automatic weighing machine, comprising: a weigher; a reciprocable carriage; a framework supporting said carriage for reciprocation relative thereto; mechanism for intermittently shifting said carriage in opposite directions; a plurality of material receivers pivotally mounted upon said carriage for transfer by said carriage back and forth from a position over said weigher to a discharge position, and from said discharge position to said position over said weigher; means responsive to the deposit of a given weight of material in the receiver over the weigher for setting said carriage shifting mechanism into operation to shift said carriage when a predetermined weight of material has been introduced into said receiver; a projection carried by each of said receivers spaced from the pivotal axis of the respective receivers; and spaced rails on said framework receiving said projections therebetween and defining a path of predetermined contour for said projections such that, when either of the receivers is being moved toward its discharge position said rails will be engaged by the projection on the particular receiver being moved toward its discharge position and cause said receiver to tilt and discharge its contents.

14. An automatic weighing machine, comprising: a carriage including side members provided with longitudinally spaced, elongated, upright slots; a pair of material receivers, each of said receivers being hollow and substantially semi-cylindrical and having trunnions secured to the end walls thereof at a point adjacent the upper edge of said end walls and substantially medially thereof, said trunnions being disposed in the slots in said carriage; a guide frame supporting said carriage for shifting movement in opposite directions relative to said guide frame between two predetermined limits of travel; mechanism for shifting said carriage back and forth; a weigher located at a position such that it is in alignment with the trunnions of one or the other of said receivers when said carriage is at either limit of its travel; means operable while said carriage is stationary for engaging the trunnions of, and transferring the weight of the particular receiver aligned with said weigher to said weigher; means responsive to the deposit of a predetermined weight of material in the receiver on the weigher for actuating said receiver weight-transferring means to lift the loaded receiver from said weigher and for actuating said carriage shifting mechanism to effect shifting of said carriage to shift the loaded weigher to a dumping position, while at the same time shifting the empty receiver into a position in alignment with said weigher; and dumping mechanism automatically operable to effect dumping of the loaded receiver while it is being moved toward its discharge position by said carriage.

15. An automatic weighing machine, comprising: a carriage including side members provided with two pairs of longitudinally spaced, elongated, upright slots; a pair of material receivers having supporting trunnions disposed in respective pairs of said slots; a guide frame for said carriage; rollers on said carriage engaging said guide frame and supporting said carriage for intermittent reciprocating movement relative to said guide frame and between two predetermined limits of travel; operating mechanism connected with said carriage for effecting intermittent reciprocation thereof; a weigher having a yoke located at a point substantially midway of the length of said guide frame and in a position such that the trunnions of one or the other of said receivers is in alignment therewith when said carriage is at either limit of its travel; vertically movable arms aligned with said weigher; operating mechanism for lowering and raising said arms; cams on said guide frame engageable by the trunnions on said receivers for raising one or the other of said receivers relative to said carriage so that said trunnions will be supported by the upper ends of said arms when said carriage reaches either limit of its travel, said arms being adapted to then be lowered to transfer the weight of the receiver supported thereby to said yoke of said weigher; means for driving said carriage and arm operating mechanisms in timed relation; means responsive to the deposit of a predetermined weight of material in the receiver on the weigher, controlling said drive means so that said drive means is automatically set into operation when a predetermined weight of material has been introduced into said receiver to cause said reciprocable arms to rise and engage the trunnions of the loaded receiver and to lift the same off the yoke of said weigher, and to thereafter shift said carriage to move the loaded receiver off the upper ends of said arms; and means cooperable with the loaded receiver for effecting a discharge of the contents of said loaded receiver after it has been moved off said arms.

16. An automatic weighing machine as defined in claim 15, in which the drive means for the carriage and arm operating mechanisms includes a one-revolution clutch.

17. An automatic weighing machine as defined in claim 15, in which the operating mechanism for intermittently reciprocating the carriage includes a Geneva wheel and means for converting rotary motion of said Geneva wheel into reciprocating motion of said carriage; and wherein the operating mechanism for lowering and raising the arms which engage the receiver trunnions includes a roller on one of said arms and a rotary cam engaging said roller.

18. An automatic weighing machine, comprising: a weigher; a reciprocable carriage; a framework guiding said carriage for shifting movement in opposite directions relative thereto; a plurality of material receivers mounted upon said carriage for transfer by said carriage back and forth from a position over said weigher to a dumping position and from said dumping position to said position over said weigher, said carriage having rest positions in which one or the other of the receivers is aligned with said weigher, said weigher having a member engageable with the particular receiver aligned with said weigher; intermittently driven mechanism operable to effect intermittent reciprocation of said carriage between said rest positions; intermittently driven mechanism cooperable with said weigher member for supporting and lowering the particular receiver aligned with said weigher onto said weigher member for a weighing operation and for lifting said receiver from said weigher member after a predetermined weight of material has been deposited into said receiver; drive means including a continuously rotating drive member and a driven member frictionally engaged therewith; means for arresting the rotation of said driven member after it has made one revolution; means responsive to the deposit of a given weight of material in the receiver on the weigher for momentarily rendering said arresting means ineffective when a predetermined weight of material has been deposited in said receiver; and automatic means for effecting dumping of a loaded receiver as said carriage is being shifted to move such receiver to its dumping position.

19. An automatic weighing machine, comprising: a weigher; a reciprocable carriage; a framework guiding said carriage for shifting movement in opposite directions relative thereto; a plurality of material receivers mounted upon said carriage for transfer by said carriage back and forth from a position over said weigher to a dumping position and from said dumping position to said position over said weigher, said carriage having rest positions in which one or the other of the receivers is aligned with said weigher, said weigher having a member engageable with the particular receiver aligned therewith; mechanism operable to effect shifting movement of said carriage between said rest positions; mechanism cooperable with said weigher member for supporting and lowering the particular receiver aligned with said weigher onto said weigher member for a weighing operation and for lifting said receiver from said weigher member after a predetermined weight of material has been deposited into said receiver; means for intermittently driving said carriage shifting mechanism and said receiver lowering and raising mechanism including a slip-type friction clutch having an intermittently driven element; and a continuously rotating driving element; an arm secured to said driven clutch element; a holding member normally positioned in the path of travel of said arm to hold said driven clutch element against rotation; and electromagnet adapted to be energized to move said holding member out of the path of travel of said arm so that said driven clutch element can rotate and drive said mechanisms; a normally open switch connected in a circuit with said electromagnet, said switch including stationary contact means, and movable contact means carried by said weigher member, said movable contact means being adapted to engage with said stationary contacts to complete the circuit to said electromagnet to energize the same upon movement of said weigher member in response to the deposit of a given weight of material in the receiver on the weigher; and mechanism for effecting dumping of a loaded receiver as said carriage is being shifted to move such receiver to its dumping position.

GLEN M. TRACY.

REFERENCES CITED

The following references are of record in the file of this patent:

UNITED STATES PATENTS

| Number | Name | Date |
| --- | --- | --- |
| 226,511 | Fry | Apr. 13, 1880 |
| 404,225 | Reynolds | May 28, 1889 |
| 433,422 | Ross | July 29, 1890 |
| 441,302 | Harmless | Nov. 25, 1890 |
| 449,276 | Smyser | Mar. 31, 1891 |
| 475,405 | Lombard | May 24, 1892 |
| 627,464 | Abbott | June 27, 1899 |
| 720,008 | Doble | Feb. 10, 1903 |
| 749,659 | Brough | Jan. 12, 1904 |
| 884,618 | Schubert | Apr. 14, 1908 |
| 1,149,079 | Popow | Aug. 3, 1915 |
| 1,179,858 | Menier | Apr. 18, 1916 |
| 1,199,687 | Gephardt | Sept. 26, 1916 |
| 1,228,540 | Drueker | June 5, 1917 |
| 1,736,079 | Hallwood | Nov. 19, 1929 |
| 1,940,057 | McLaughlin | Dec. 19, 1933 |
| 2,116,895 | Howard | May 10, 1938 |
| 2,296,976 | Bone | Sept. 29, 1942 |
| 2,408,225 | Peterson | Sept. 24, 1946 |

FOREIGN PATENTS

| Number | Country | Date |
| --- | --- | --- |
| 4,597 | Great Britain | 1909 |
| 50,062 | Austria | 1911 |
| 434,501 | Great Britain | 1935 |